US011158976B2

(12) United States Patent  (10) Patent No.: US 11,158,976 B2
Shahriar                        (45) Date of Patent:    Oct. 26, 2021

(54) APPARATUS AND METHOD FOR PROTECTING AN ELECTRICAL CONNECTION FROM THE ENVIRONMENT

(71) Applicant: Khaled M. Shahriar, Farmingdale, NY (US)

(72) Inventor: Khaled M. Shahriar, Farmingdale, NY (US)

( * ) Notice: Subject to any disclaimer, the term of this patent is extended or adjusted under 35 U.S.C. 154(b) by 0 days.

(21) Appl. No.: 16/728,390

(22) Filed: Dec. 27, 2019

(65)  Prior Publication Data
     US 2020/0212622 A1    Jul. 2, 2020

Related U.S. Application Data

(60) Provisional application No. 62/785,652, filed on Dec. 27, 2018.

(51) Int. Cl.
    *H01R 13/46*   (2006.01)
    *H01R 13/52*   (2006.01)
    *H01R 13/514*  (2006.01)

(52) U.S. Cl.
    CPC ....... *H01R 13/5213* (2013.01); *H01R 13/514* (2013.01)

(58) Field of Classification Search
    CPC .. H01R 13/5213; H01R 13/52; H01R 13/514; H01R 13/516; H01R 13/502; H01R 13/50; H01R 13/46
    USPC ......................................................... 439/135
    See application file for complete search history.

(56)  References Cited

U.S. PATENT DOCUMENTS

| 3,805,055 | A | * | 4/1974 | Cassey .................... F21V 21/06 362/358 |
| 4,643,505 | A | * | 2/1987 | House ................ H01R 13/6392 174/92 |
| 4,649,678 | A | * | 3/1987 | Lamson ............. E01F 15/0469 248/530 |
| 4,774,648 | A | * | 9/1988 | Kakuk .................. F21V 17/164 362/302 |
| 4,814,961 | A | * | 3/1989 | O'Brien .................. F21S 8/083 362/291 |
| 4,826,448 | A |   | 5/1989 | Maddock |
| 4,915,638 | A | * | 4/1990 | Domian ............... H01R 13/447 174/67 |
| 4,996,636 | A | * | 2/1991 | Lovett ..................... F21S 8/081 362/431 |
| 5,055,987 | A | * | 10/1991 | Ellson ..................... F21V 14/04 362/277 |
| 5,122,789 | A | * | 6/1992 | Ito ............................ G06F 3/14 345/213 |
| 5,551,888 | A | * | 9/1996 | Rhodes, Sr. ....... H01R 13/6392 439/367 |
| 5,834,690 | A |   | 11/1998 | Bastiaansen |
| 6,300,570 | B1 |  | 10/2001 | Lai |

(Continued)

*Primary Examiner* — Harshad G Patel
(74) *Attorney, Agent, or Firm* — Barclay Damon LLP

(57)  ABSTRACT

An apparatus and method for protecting an electrical connection from the environment is provided. The apparatus includes a cover and a base attached to the bottom portion of the cover forming an enclosed chamber with the cover. The apparatus can further include a support post configured to elevate the enclosed chamber above a ground surface, wherein the first end of the support post is attached to and extends downward from the base and the second end of the support post is configured to be mounted on or to the ground surface.

17 Claims, 3 Drawing Sheets

(56) References Cited

U.S. PATENT DOCUMENTS

| | | | | |
|---|---|---|---|---|
| 6,481,875 B1 * | 11/2002 | Bryant | ................... | F21V 17/06 |
| | | | | 362/123 |
| 7,041,899 B2 * | 5/2006 | Stekelenburg | ......... | H01R 25/00 |
| | | | | 174/50 |
| 7,056,145 B2 * | 6/2006 | Campbell, III | .... | H01R 13/6395 |
| | | | | 174/67 |
| 7,073,919 B1 * | 7/2006 | Masina | ................... | F21S 8/081 |
| | | | | 362/153.1 |
| 7,544,082 B1 * | 6/2009 | Halvorsen | ......... | H01R 13/5213 |
| | | | | 174/135 |
| 7,824,082 B2 * | 11/2010 | Hanson | ............... | E04H 12/2215 |
| | | | | 362/382 |
| 8,183,475 B2 | 5/2012 | Dukes et al. | | |
| 8,225,545 B1 | 7/2012 | Collins | | |
| 8,546,694 B1 | 10/2013 | Harrison | | |
| 9,425,604 B1 | 8/2016 | Lawrence | | |
| 9,899,823 B1 * | 2/2018 | Catinis | ..................... | F16L 3/06 |
| 2004/0252499 A1 * | 12/2004 | Tumlinson | ................ | F21S 8/04 |
| | | | | 362/228 |
| 2015/0108363 A1 * | 4/2015 | Kanazawa | .............. | F04D 25/06 |
| | | | | 250/423 R |

\* cited by examiner

APPARATUS AND METHOD FOR PROTECTING AN ELECTRICAL CONNECTION FROM THE ENVIRONMENT

CROSS-REFERENCE TO RELATED APPLICATIONS

This application claims the benefit and priority of U.S. Patent Application 62/785,652, filed Dec. 27, 2018, and entitled OUTDOOR ELECTRICAL EXTENSION ENCLOSURE FOR RAIN AND FLOOD WATER PROTECTION, the entirety of which is incorporated herein by reference.

TECHNOLOGICAL FIELD

This subject matter disclosed herein relates to an apparatus and method for protecting an electrical connection from the environment, including providing protection from precipitation or other sources of water.

BACKGROUND

Electrical extension cords comprising a plug on one end connected by an electrical cable to one or more sockets on the other end are used to extend and provide electrical power (e.g., 120 VAC power) from an electrical outlet (e.g., mounted on an outdoor wall) to a device requiring electrical power that is located remotely from the electrical outlet. For example, many homeowners or retail businesses decorate their outdoor properties with devices (e.g., seasonal or holiday lighting, inflatable toys, etc.) that require electrical power to operate and whose electrical cords with plugs are not of a sufficient length to extend to an available electrical outlet and therefore must be connected to those outlets via electrical extension cords. Similarly, contractors often need to power devices in outdoor environments using electrical extension cords. In many cases, a plurality of electrical extension cords are connected in series from the electrical outlet to the electrically powered devices, with the socket of one electrical cord mating with the plug of the next extension cord. Once a sufficient length is provided by the plurality of electrical extension cords to reach the electrically powered device, the plug of the device is connected to the socket of the extension cord proximate the remotely located device.

In many cases, these outdoor devices and the electrical extension cords are exposed to precipitation in the form of rain or snow or other sources of water (e.g., landscaping irrigation systems). For example, the electrical extension cords for these outdoor devices are often installed along and a rest on a ground surface (e.g., including unpaved surfaces (grass, dirt, landscaping beds) and paved surfaces (pavers, asphalt, concrete)) that are exposed to these environmental conditions and, depending on the severity of the precipitation, can become fully or partially submerged in water for an extended period of time. In the event that moisture undesirably infiltrates any of the electrical connections made between the plugs and sockets of the electrical extension cords or between the plugs of the devices and the sockets of the extension cords, this may result in a short circuit that can, e.g., cause the circuit breaker protecting the electrical outlet to trip and disconnect power. In addition, such undesirable infiltration of moisture into the electrical connections can create a safety risk of an electrical shock to an unsuspecting person or child who may encounter the exposed electrical connection.

SUMMARY

An apparatus for protecting an electrical connection from the environment is disclosed. In one embodiment, the apparatus comprises a cover comprising a top portion and a bottom portion. The apparatus also comprises a base attached to the bottom portion of the cover forming an enclosed chamber with the cover. In one embodiment, the base comprises a top surface, a bottom surface, an outer edge, and a first electrical cord opening extending inwardly from the outer edge of the base, wherein the first electrical cord opening is configured to receive one or more electrical cords extending through the base and into the enclosed chamber. The apparatus can further include a support post having a first end and a second end, wherein the first end of the support post is attached to and extends downward from the base and the second end of the support post is configured to be mounted on or to a ground surface. This support post is configure to elevate the enclosed chamber containing the electrical connection above any water on the ground surface.

A method for protecting an electrical connection from the environment is also disclosed. In one embodiment, the method includes the steps of inserting a first electrical cord having a socket through one or more electrical cord openings in a base, inserting a second electrical cord having a plug through the one or more electrical cord openings in the base, forming an electrical connection between the first electrical cord and the second electrical cord by inserting the plug into the socket, and attaching a cover onto the base forming an enclosed chamber around the electrical connection. The method can also further comprise mounting a support post that is attached to the base on or to a ground surface, wherein the support post maintains a clearance elevation distance between the base and the ground surface, separating the enclosed chamber from any water on the ground surface.

The above embodiments are exemplary only. Other embodiments are within the scope of the disclosed subject matter.

BRIEF DESCRIPTION OF DRAWINGS

A more particular description of the invention briefly summarized above may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Thus, for further understanding of the nature and objects of the invention, references can be made to the following detailed description, read in connection with the drawings in which.

DETAILED DESCRIPTION

Figure 1:
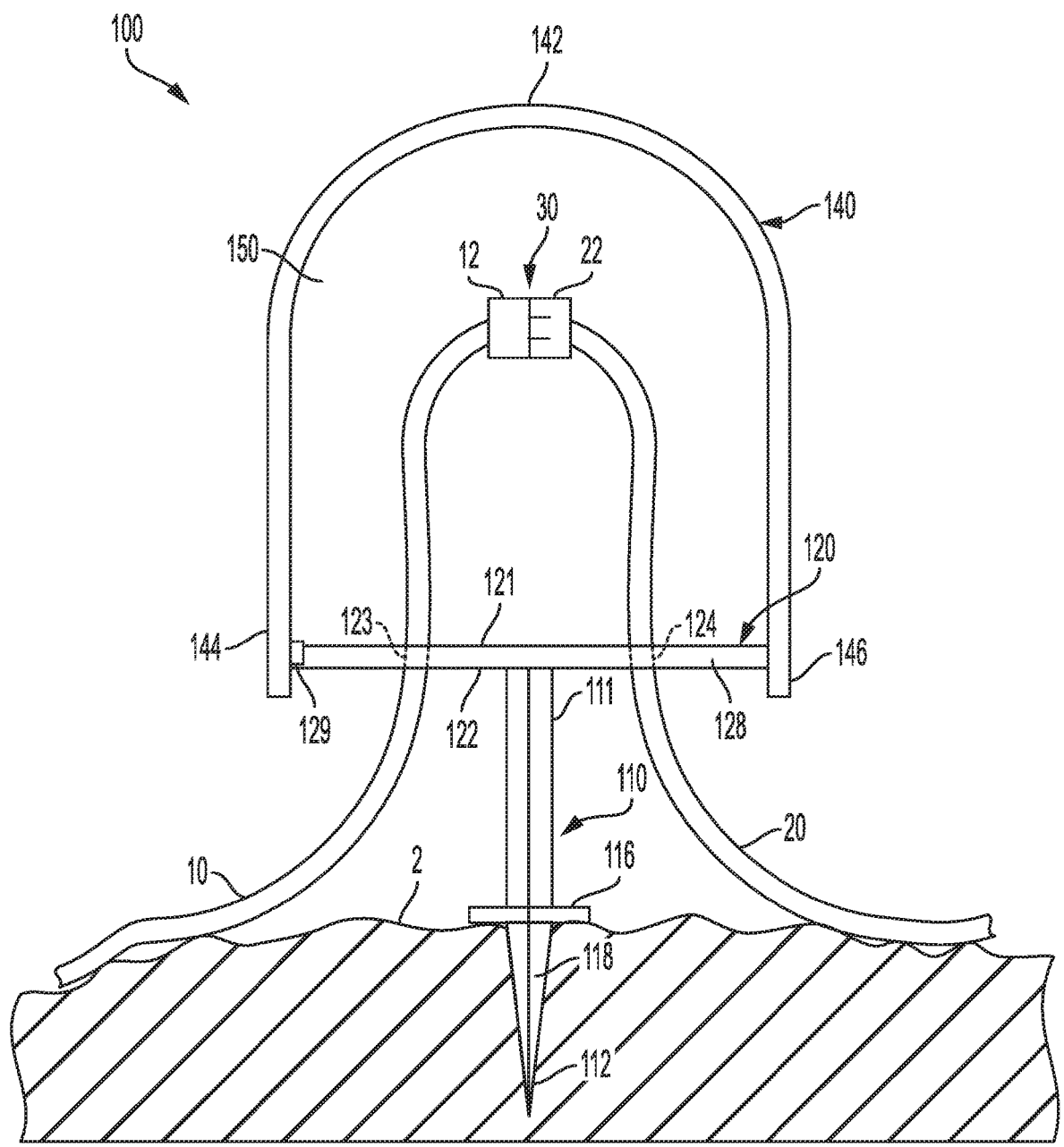
FIG. 1 illustrates an elevation view of an exemplary embodiment of an apparatus for protecting an electrical connection from the environment.

The following detailed description refers to the accompanying drawings. Whenever possible, the same reference numbers are used in the drawings and the following description to refer to the same or similar elements. It will be understood that the herein described versions are examples that embody certain inventive concepts as detailed herein. To that end, other variations and modifications will be readily apparent to those of sufficient skill. In addition, certain terms are used throughout this discussion in order to provide a suitable frame of reference with regard to the accompanying drawings. These terms such as "upper", "lower", "forward", "rearward", "interior", "exterior", "front", "back", "top", "bottom", "inner", "outer", "first", "second", and the like are not intended to limit these concepts, except where so specifically indicated. With regard to the drawings, their purpose is to depict salient features of the enclosure and associated security system and are not specifically provided to scale.

Figure 2:
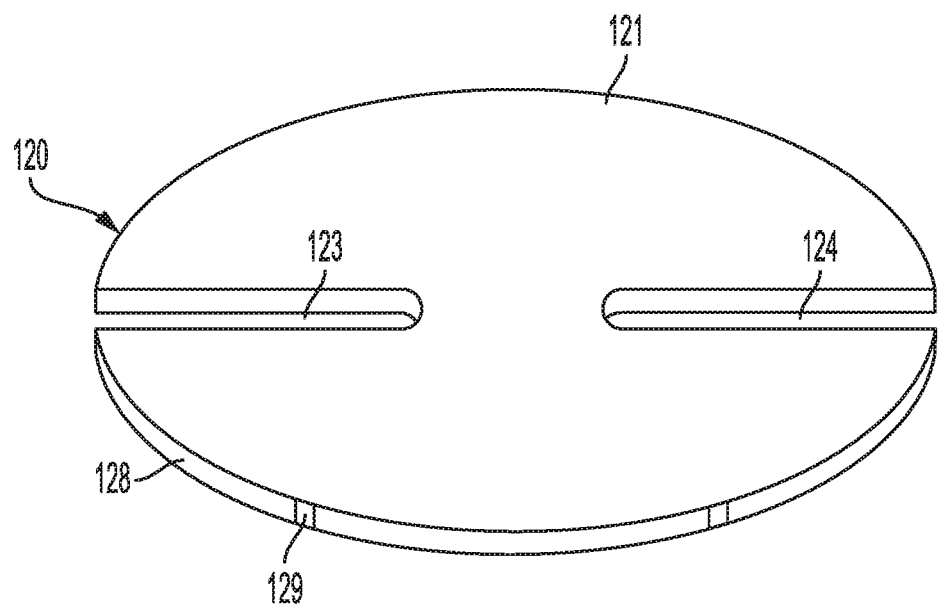
FIG. 2 illustrates a top perspective view of an exemplary embodiment of the base of the apparatus for protecting an electrical connection from the environment.

FIGS. 1 and 2 illustrate an exemplary embodiment of an apparatus 100 for protecting an electrical connection 30 from the environment. The apparatus 100 can include a cover 140 with a top portion 142 and a bottom portion 144. In the exemplary embodiment, the top portion 142 of the cover 140 is convex-shaped (e.g., dome-shaped, cone-shaped, etc.) to prevent the accumulation of water on the cover 140 from precipitation or other sources of water. In other embodiments, the cover 140 can be another curved shape or non-curved shape. The cover 140 can be made of a transparent material to allow a user the view the electrical connection 30 below the cover 140 In other embodiments, the cover 140 can be made of an opaque material where a user cannot view the electrical connection 30 below the cover 140. In some embodiments, the cover 140 can be decorated.

Figure 3:
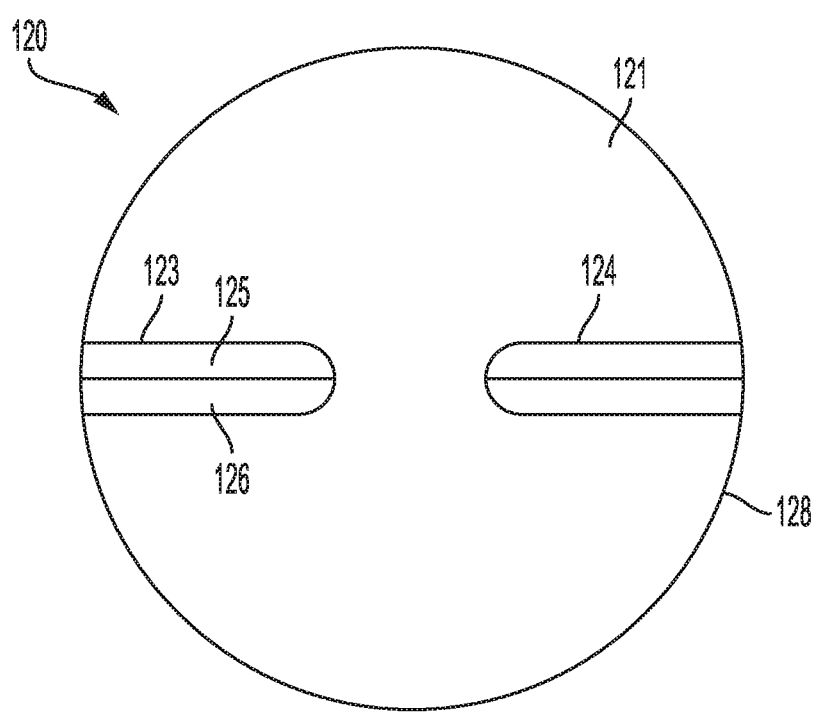
FIG. 3 illustrates a top view of the of another exemplary embodiment of the base of the apparatus for protecting an electrical connection from the environment.

As seen in FIGS. 1-3, the apparatus 100 can also include a base 120 attached to the bottom portion 144 of the cover 140 forming an enclosed chamber 150 with the cover 140. Both the cover 140 and the base 120 form a shield around the enclosed chamber 150, protecting it from the environment. In one embodiment, the outer edge 128 of the base 120 comprises attachment ribs 129 for attaching the bottom portion 144 of the cover 140 to the base 120. In another embodiment, the cover 140 can be attached to the base 120 using a hinged connection or a threaded connection. As can be seen in FIG. 1, when the plug 12 is mated with the socket 22, and electrical connection 30 is formed. When the cover 140 is then attached to the base 120, the electrical connection 30 is protected from the environment in the enclosed chamber 150. It will be understood that, although the exemplary embodiment shown in FIG. 1 includes a single electrical connection 30 between two electrical cables 10, 20, a single apparatus 100 can protect a plurality of electrical connections between a plurality of electrical cables.

In one embodiment, the base 120 comprises a top surface 121, a bottom surface 122, and a first electrical cord opening 123 and a second electrical cord opening 124 extending inwardly from the outer edge 128 of the base 120. The top surface 121 provides a surface for the electrical cords 10, 20 and electrical connection 30 between the plug 12 and the socket 22 to rest upon within the enclosed chamber 150.

In the exemplary embodiment shown in FIGS. 1-3, the first electrical cord opening 123 is configured to receive a first electrical cord 10 having a plug 12 where the first electrical cord 10 extends through the base 120, and the second electrical cord opening 124 is configured to receive a second electrical cord 20 having a socket 22, where the second electrical cord 20 extends through the base 120. The first electrical cord 10 with plug 12 can be an electrical cord from, e.g., an electrical extension cord or an electrical device. The second electrical cord 20 with socket 22 can be an electrical cord from, e.g., an electrical extension cord or some other extension from an outlet device.

Although in the exemplary embodiment shown in FIGS. 1-3, there are two electrical cord openings 123, 124, with one opening used for each electrical cord 10, 20, it will be understood that in other embodiments, a single electrical cord opening could be formed in the base 120 for receiving a plurality of electrical cords. In other embodiments, more than two electrical cord openings can be formed in the base 120 for receiving a plurality of electrical cords.

In the exemplary embodiment shown in FIGS. 1-3, the electrical cord openings 123, 124 are linear slots extending radially inwardly from the outer edge 128 of the base 120. In other embodiments, the slots can be curvilinear or some other non-linear configuration. The size of the electrical cord openings 123, 124 can be proportional to the size of the enclosed chamber 150 formed by the cover 140 or the length of the skirt 146 formed by the cover 140 below the base 120. For example, for an apparatus 100 where the enclosed chamber 150 formed by the cover 140 is configured to enclose a single electrical connection 30 between two electrical cords 10, 20, the electrical cord openings 123, 124 may have a width equivalent to the diameter of a 16 gauge 2-wire cable.

In the exemplary embodiment shown in FIGS. 1-3, the electrical cord openings 123, 124 are radially symmetrically disposed about the center of the base 120. In other embodiments, the electrical cord openings 123, 124 can be disposed in an asymmetrical manner and need not be radially disposed (i.e., can be off-center).

The electrical cords openings 123, 124 are dimensioned to be of a sufficient width to receive the electrical cords 10, 20 and allow the electrical cords 10, 20 to pass through the base 120 and into the enclosed chamber 150 formed when the cover 140 is attached to the base 120. The electrical cord openings 123, 124 are also dimensioned to be narrower than the widths of the plug 12 and the socket 14 to prevent the electrical cords 10, 20 from falling back through electrical cord openings 123, 124 once the electrical cords 10, 20 are inserted through the base 120.

In one alternative embodiment shown in FIG. 3, the electrical cord openings 123, 124 can include a first flap 125 and a second flap 126 configured to receive electrical cords 10, 12. These resilient flexible flaps 125, 126 can be thinner than the thickness of the base 120 and assist in receiving and holding the electrical cords 10, 20 in place once they are passed through the base 120. For example, when the electrical cords 10, 20 are passed through the electrical cord openings 123, 124, the flaps 125, 126 are deflected allowing the electrical cords 10, 20 to pass through but maintain resilient contact with the electrical cords 10, 20. In doing so, the flaps 125, 126 not only can assist in holding the electrical cords 10, 20 in place, the flaps 125, 126 can also substantially seal the electrical cord openings 123, 124 and prevent the infiltration of moisture into the enclosed chamber 150 for example by irrigation sprinklers located near and below the base 120 of the apparatus 100.

As shown in the exemplary embodiment illustrated in FIG. 1, the bottom portion 144 of the cover 140 can extend below the bottom surface 122 of the base 120 forming a protective skirt 146 around the outer edge 128 of the base 120. This skirt 146 can also help prevent the infiltration of moisture into the enclosed chamber 150 for example by irrigation sprinklers located near and below the base 120 of the apparatus 100. In another embodiment, the bottom portion 144 of the cover 140 can be attached flush with the base 120.

In the exemplary embodiment shown in FIG. 1, the apparatus 100 includes a support post 110 having a first end 111 and a second end 112. The support post 110 will be understood to include a post, ground stake, a riser, a floor stand, or any number of structures that elevate the enclosed chamber 150 containing the electrical connection 30 above any water on the ground surface 2, 3 (see FIG. 4), eliminating or minimizing the possibility of water infiltrating the enclosed chamber 150 and the electrical connection 30. In one embodiment, the support post 110 provides at least six inches (15.24 cm) of clearance elevation between the bottom surface 122 of the base 120 and the ground surface 2, 3. In another embodiment, the support post 110 provides at least twelve inches (30.48 cm) of clearance elevation between the bottom surface 122 of the base 120 and the ground surface 2, 3. It will be understood that support posts 110 of all lengths providing different levels of clearance elevation are within the scope of the invention.

The first end 111 of the support post 110 is attached to and extends downward from the bottom surface 122 of the base 120. The second end 112 of the support post 110 is configured to be mounted on or to a ground surface 2, 3 (e.g., inserted into a unpaved surface (FIG. 1) or placed on top of a paved surface (FIG. 4)). It will be understood that the reference to "ground surface" herein broadly includes unpaved surfaces (grass, dirt, landscaping beds) and paved surfaces (pavers, asphalt, concrete)). In one embodiment, the base 120 and the support post 110 are a single integrated component. In other embodiments, the base 120 and the support post 110 can be separate components attached together.

In one exemplary embodiment shown in FIG. 1, the second end 112 of the support post 110 comprises a ground stake 118 configured to be inserted into the ground surface 2 (e.g., the an unpaved surface). The support post 110 can also comprise a ground surface spacer 116 located between the first and second ends of the support post 110 configured to prevent the support post 110 from being inserted into the ground surface 2 past the ground surface spacer 116 in order to maintain sufficient clearance elevation between the base 120 and the ground surface.

Figure 4:
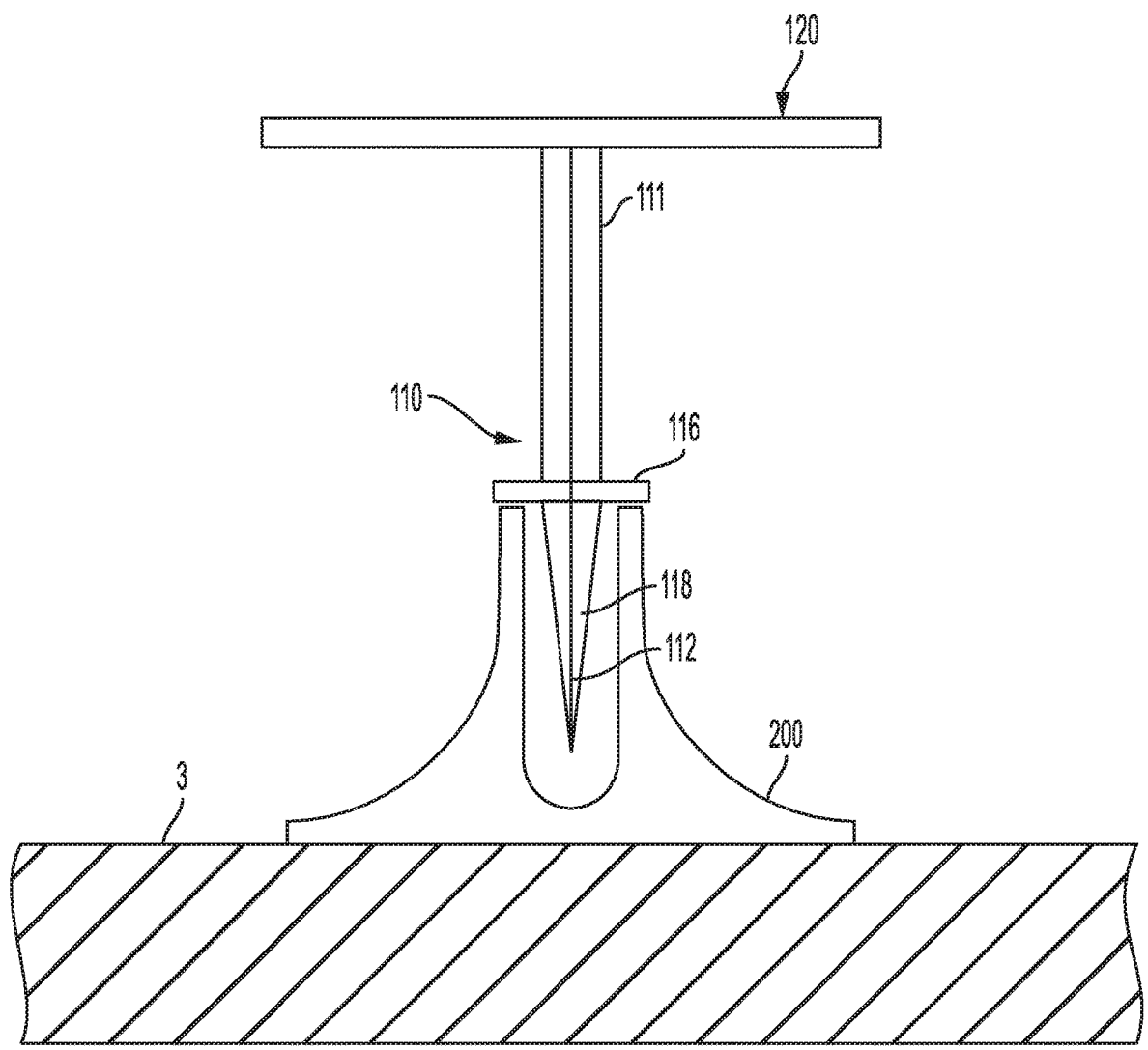
FIG. 4 illustrates an elevation view of the of another exemplary embodiment of the support post mounted to a paved ground surface using a pedestal.

FIG. 4 illustrates an elevation view of the of another exemplary embodiment of the support post 110 mounted to a paved ground surface 3 using a pedestal 200. As can be seen in the figure, rather than being inserted into an unpaved ground surface 2 as shown in FIG. 1, the ground stake 118 on the second end 112 of the support post 110 can be placed into a pedestal 200 dimensioned and configured to receive the ground stake 118 with the ground stake spacer 116 resting on the top of the pedestal 200. In the embodiment shown in FIG. 4, the pedestal 200 and the support post 110 are separate components. In another embodiment, the pedestal 200 and the support post 100 can be a single integrated component.

A method for protecting an electrical connection 30 from the environment is also disclosed and shown in FIG. 1. In one embodiment, the method includes the steps of inserting a first electrical cord 10 having a socket 12 and a second electrical cord 20 having a plug 22 through the one or more electrical cord openings 123, 124. Once the cords 10, 12 are inserted, a user can form an electrical connection 30 between the first electrical cord 10 and the second electrical cord 20 by inserting the plug 12 into the socket 22. After the electrical connection 30 is formed, the user can attach a cover 140 onto the base 120 forming an enclosed chamber 150 around the electrical connection 30 and protecting the electrical connection 30 from the environment. The method can also further include mounting a support post 110 that is attached to the base 120 on or to a ground surface 2, wherein the support post 110 maintains a clearance elevation distance between the base 120 and the ground surface 2. The support post 110 elevates the enclosed chamber 150 containing the electrical connection 30 above any water on the ground surface 2, eliminating or minimizing the possibility of water infiltrating the enclosed chamber 150 and the electrical connection 30. It will be understood that the step of mounting the support post 110 on or to a ground surface 2 can take place before or after the electrical connection 30 is formed and the enclosed chamber 150 is formed around the electrical connection 30 and protecting the electrical connection 30 from the environment.

While the present invention has been particularly shown and described with reference to certain exemplary embodiments, it will be understood by one skilled in the art that various changes in detail may be effected therein without departing from the spirit and scope of the invention that can be supported by the written description and drawings. Further, where exemplary embodiments are described with reference to a certain number of elements, it will be understood that the exemplary embodiments can be practiced utilizing either less than or more than the certain number of elements.

PARTS LIST 2 ground surface (unpaved)
3 ground surface (paved)
10 first electrical cord
12 first electrical cord plug
20 second electrical cord
22 second electrical cord socket
30 electrical connection
100 enclosure apparatus
110 support post
111 first end (support)
112 second end (support)
116 ground surface spacer
118 ground stake
120 base
121 top surface
122 bottom surface
123 first electrical cord opening
124 second electrical cord opening
125 electrical cord opening first flap
126 electrical cord opening second flap
128 outer edge
129 attachment rib
140 cover
142 top portion (cover)
144 bottom portion (cover)
146 skirt
150 enclosed chamber
200 pedestal

The invention claimed is:

1. An apparatus for protecting an electrical connection from the environment, the apparatus comprising:
a cover comprising a top portion and a bottom portion;
a base attached to the bottom portion of the cover forming an enclosed chamber with the cover, the base comprising
a top surface, a bottom surface, an outer edge, and a first electrical cord opening extending inwardly from the outer edge of the base, wherein the first electrical cord opening is a slot configured to receive one or more electrical cords extending through the base and into the enclosed chamber, and wherein the slot further comprises one or more flaps configured to receive the one or more electrical cords; and a support post configured to elevate the enclosed chamber above a ground surface, the support post having a first end and a second end, wherein the first end of the support post is attached to and extends downward from the base and the second end of the support post is configured to be mounted on or to the ground surface.

2. The apparatus of claim 1, wherein the top portion of the cover is convex-shaped.

3. The apparatus of claim 1, wherein the bottom portion of the cover extends below the bottom surface of the base forming a protective skirt around the outer edge of the base.

4. The apparatus of claim 1, wherein the slot is linear.

5. The apparatus of claim 1, wherein the base further comprises a second electrical cord opening configured to receive the one or more electrical cords extending through the base and into the enclosed chamber.

6. The apparatus of claim 1, wherein the outer edge of the base comprises attachment ribs for attaching the bottom portion of the cover to the base.

7. The apparatus of claim 1, wherein the base and the support post are a single integrated component.

8. The apparatus of claim 1, wherein the first end of the support post is attached to the bottom surface of the base.

9. The apparatus of claim 1, wherein the second end of the support post comprises a ground stake.

10. The apparatus of claim 9, wherein the support post comprises a ground surface spacer located between the first and second ends of the support post configured to prevent the support post from being inserted into the ground surface past the ground surface spacer.

11. The apparatus of claim 9, wherein the apparatus further comprises a pedestal configured for receiving the ground stake of the support post, wherein the pedestal is configured to be mounted on the ground surface.

12. An apparatus for protecting an electrical connection from the environment, the apparatus comprising:

a cover comprising a top portion and a bottom portion, a base attached to the bottom portion of the cover forming an enclosed chamber with the cover, the base comprising a top surface and a bottom surface, and a first electrical cord opening, wherein the first electrical cord opening is a slot configured to receive one or more electrical cords extending through the base and into the enclosed chamber, and wherein the slot further comprises one or more flaps configured to receive the one or more electrical cords; and a support post configured to elevate the enclosed chamber above a ground surface, the support post having a first end and a second end, wherein the first end of the support post is attached to and extends downward from the base and the second end of the support post is configured to be mounted on or to the ground surface.

13. The apparatus of claim 12, wherein the bottom portion of the cover extends below the bottom surface of the base forming a protective skirt around the outer edge of the base.

14. The apparatus of claim 12, wherein the second end of the support post comprises a ground stake.

15. The apparatus of claim 14, wherein the apparatus further comprises a pedestal configured for receiving the ground stake of the support post, wherein the pedestal is configured to be mounted on the ground surface.

16. The apparatus of claim 14, wherein the support post comprises a ground surface spacer located between the first and second ends of the support post configured to prevent the support post from being inserted into the ground surface past the ground surface spacer.

17. The apparatus of claim 14, wherein the base and the support post are a single integrated component.

* * * * *